United States Patent
Webb et al.

(10) Patent No.: US 12,525,140 B2
(45) Date of Patent: Jan. 13, 2026

(54) SYSTEMS AND METHODS FOR PROGRAM TRANSMISSION

(71) Applicant: Corrisoft, LLC, Lexington, KY (US)

(72) Inventors: Jim Webb, Lexington, KY (US); Alan Eargle, Lexington, KY (US); Josh Sewell, Lexington, KY (US)

(73) Assignee: CORRISOFT, LLC, Lexington, KY (US)

( * ) Notice: Subject to any disclaimer, the term of this patent is extended or adjusted under 35 U.S.C. 154(b) by 196 days.

(21) Appl. No.: 17/498,279

(22) Filed: Oct. 11, 2021

(65) Prior Publication Data

US 2023/0110536 A1    Apr. 13, 2023

(51) Int. Cl.
*G09B 19/00* (2006.01)
*G06N 3/08* (2023.01)
(Continued)

(52) U.S. Cl.
CPC ............... *G09B 19/00* (2013.01); *G06N 3/08* (2013.01); *G06N 3/044* (2023.01); *G06N 3/0464* (2023.01);
(Continued)

(58) Field of Classification Search
CPC . G09B 19/00; G09B 5/00; G09B 7/00; G06N 3/08; G06N 3/044; G06N 3/0464;
(Continued)

(56) References Cited

U.S. PATENT DOCUMENTS 6,437,696 B1    8/2002   Lemelson et al.
8,560,557 B1   10/2013   Poe
(Continued)

OTHER PUBLICATIONS

GPS-Aided Monitoring of Parolees: no privacy issues, just a large addressable market: https://insidegnss.com/gps-aided-monitoring-of-parolees-no-privacy-issues-just-a-large-addressable-market/, Inside GNSS, published May 23, 2012.
(Continued)

*Primary Examiner* — Jack Yip
(74) *Attorney, Agent, or Firm* — Dinsmore & Shohl LLP

(57) ABSTRACT

A method of targeted program transmission is provided. The method includes receiving participant data, where the participant data includes profile data and interaction data specific to the participant and making a comparison of the interaction data with an interaction threshold. Some embodiments include determining whether the participant satisfies the interaction threshold with a first programming in a first format with a first supervision level, and predicting a likelihood of the participant satisfying an additional interaction threshold associated with a second programming in a second format. In response to determining that the likelihood of the participant satisfying the additional interaction threshold exceeds a predetermined likelihood threshold, embodiments may identify the second programming in the second format for transmission to a participant device, the second format corresponding to a second supervision level that is lower than the first supervision level, and transmit data related to the second programming in the second format.

18 Claims, 15 Drawing Sheets

(51) Int. Cl.
  *G06N 3/044* (2023.01)
  *G06N 3/0464* (2023.01)
  *G06N 3/09* (2023.01)
  *G06Q 10/0631* (2023.01)
  *G06Q 50/26* (2012.01)
  *G09B 5/00* (2006.01)
  *G09B 7/00* (2006.01)

(52) U.S. Cl.
  CPC ....... *G06N 3/09* (2023.01); *G06Q 10/063114* (2013.01); *G06Q 50/265* (2013.01); *G09B 5/00* (2013.01); *G09B 7/00* (2013.01)

(58) Field of Classification Search
  CPC . G06N 3/09; G06Q 50/265; G06Q 10/063114
  See application file for complete search history.

(56) References Cited

U.S. PATENT DOCUMENTS

| | | | |
|---|---|---|---|
| 9,875,638 | B2 | 1/2018 | Rajala |
| 10,856,022 | B2* | 12/2020 | Bapna ................. H04N 21/812 |
| 10,861,307 | B2 | 12/2020 | Williams |
| 11,237,693 | B1* | 2/2022 | Tamir ................... G06F 3/0481 |
| 2004/0229560 | A1 | 11/2004 | Maloney |
| 2004/0241627 | A1* | 12/2004 | Delfing .................. G06Q 10/10 434/350 |
| 2010/0185671 | A1* | 7/2010 | Burba ................... G06F 16/637 707/780 |
| 2011/0258049 | A1* | 10/2011 | Ramer ............... G06Q 30/0273 705/14.69 |
| 2012/0231438 | A1* | 9/2012 | Fakhrai .................... G09B 7/00 434/350 |
| 2014/0024009 | A1* | 1/2014 | Nealon .................... G09B 5/12 434/362 |
| 2015/0098631 | A1 | 4/2015 | Palmer et al. |
| 2017/0084189 | A1* | 3/2017 | Rubalcaba ............... G09B 7/04 |
| 2017/0098221 | A1* | 4/2017 | Rai .................... G06Q 50/2057 |
| 2017/0293989 | A1 | 10/2017 | Hodge |
| 2018/0174259 | A1 | 6/2018 | Hodge |
| 2019/0197912 | A1* | 6/2019 | Burgin ..................... G09B 7/08 |
| 2020/0110810 | A1* | 4/2020 | Brehm ............... H04N 21/4622 |
| 2020/0175058 | A1* | 6/2020 | Peirce ................. G06F 16/4387 |
| 2021/0201690 | A1* | 7/2021 | Keat ........................ G09B 7/00 |
| 2021/0400424 | A1* | 12/2021 | Bontempo ............ H04W 4/021 |

OTHER PUBLICATIONS

International Preliminary Report on Patentability, dated Apr. 26, 2024, received in corresponding PCT Application No. PCT/US2022/077843, pp. 1-6.

\* cited by examiner

| CATEGORY SECTION 265 | WEIGHT FACTOR SECTION 266 |
|---|---|
| RISK FACTOR 250 | |
| DATE(S) OF ARREST 252 | |
| TYPE(S) OF OFFENSE 254 | |
| LATEST PHYSICAL INTERACTION 256 | |
| PROGRAM UTILIZATION 258 | |
| LOCATION PROFILE 260 | |
| RESPONSIVENESS PROFILE 262 | |

↗ 264

| PROGRAM FORMAT SECTION 268 | WEIGHT FACTOR SECTION 270 |
|---|---|
| VIDEO FORMAT 272 | |
| AUDIO FORMAT 274 | |
| INTERACTIVE VIRTUAL TUTORIAL FORMAT 276 | |
| IN PERSON MEETING 278 | |

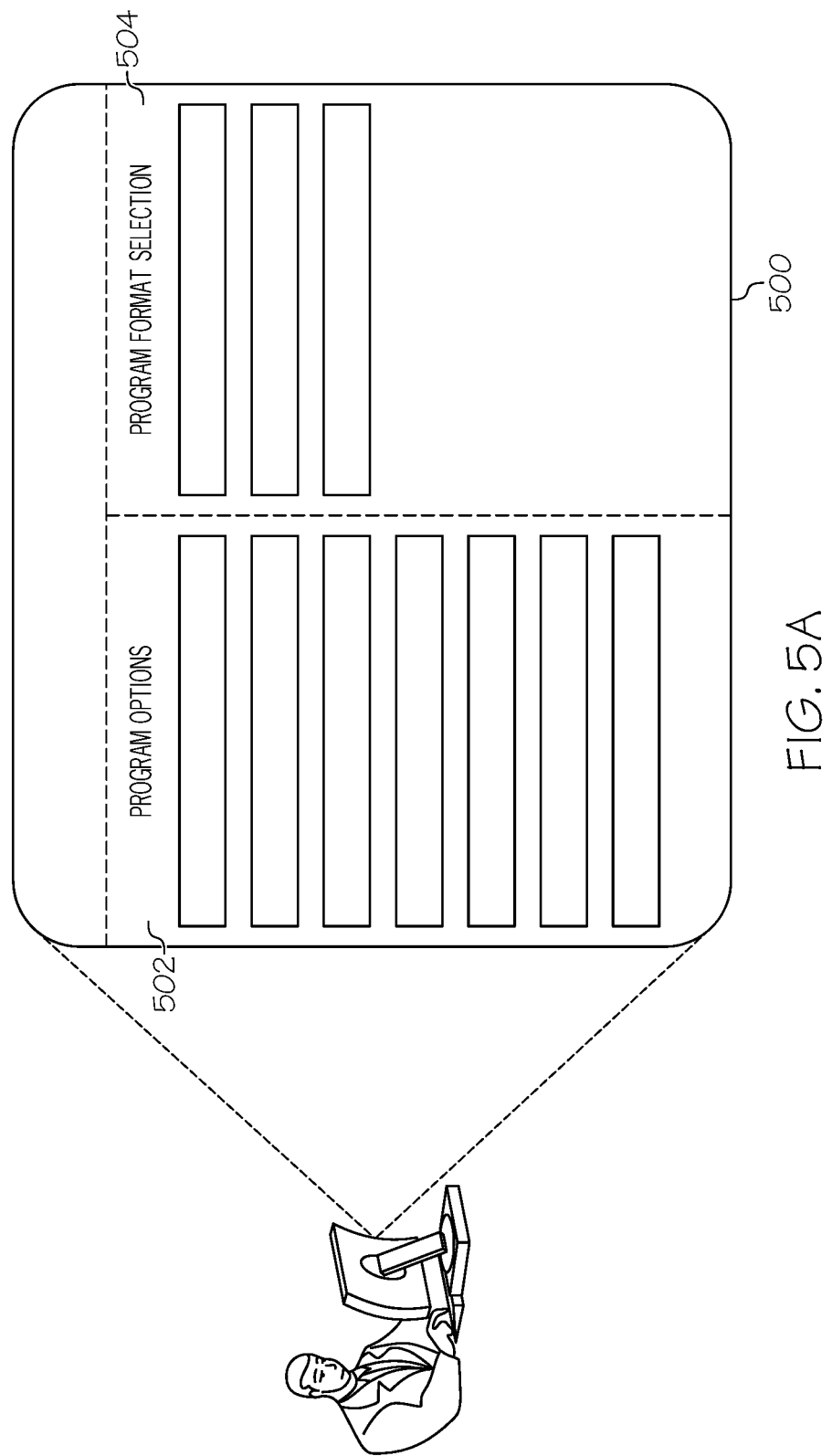

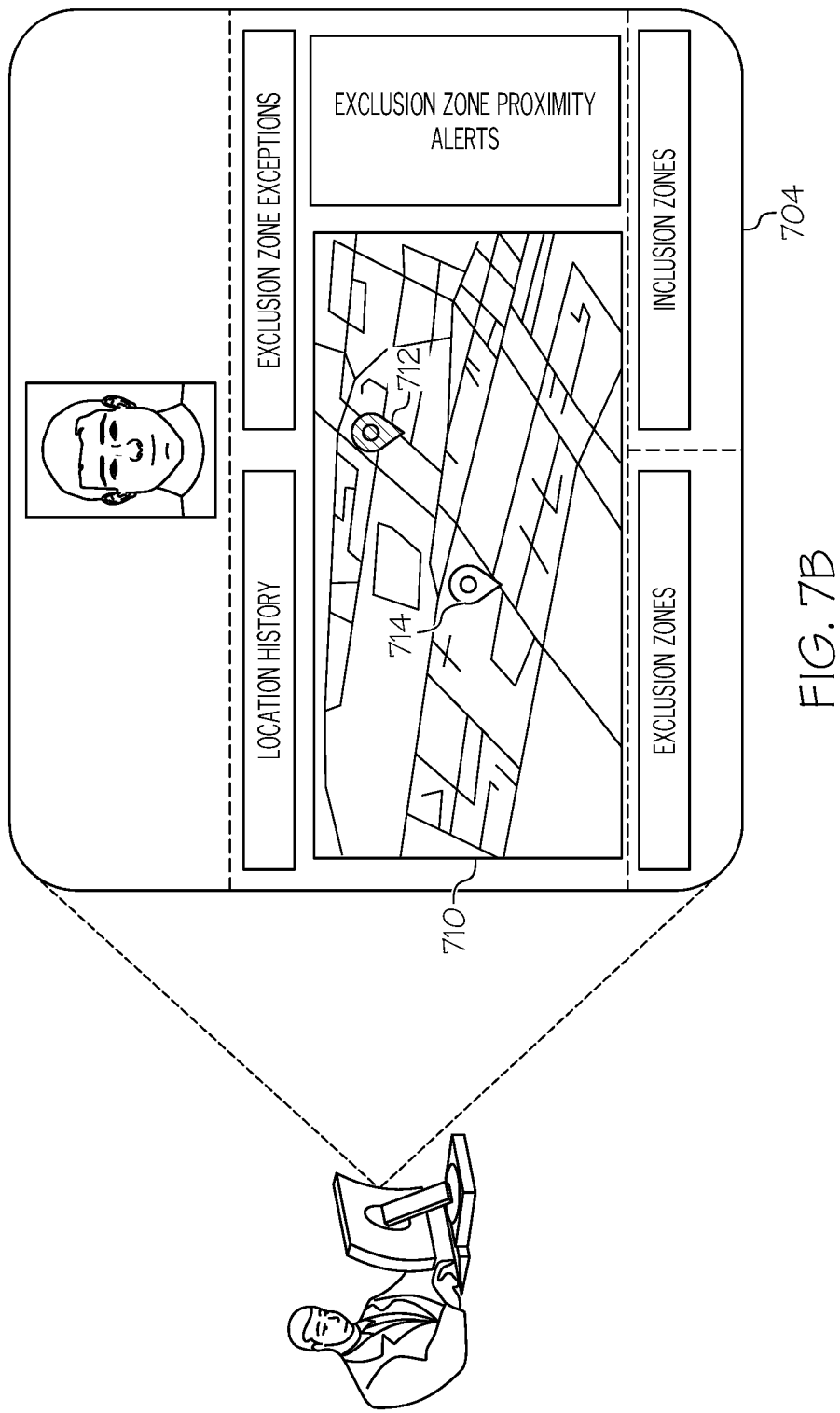

SYSTEMS AND METHODS FOR PROGRAM TRANSMISSION

TECHNICAL FIELD

The present disclosure relates to systems and methods for transmission of programming, and more specifically, to embodiments for identifying programming for transmission based on historical and real time interaction data and profile data.

BACKGROUND

One of the biggest challenges faced by prison systems is overpopulation. To address this challenge, inmates that exhibit good behavior while in prison are granted parole and released, subject to the terms and conditions of their parole. In addition, there is growing support for not incarcerating a person at all for non-violent crimes. These situations still require law enforcement/court officials responsible for ensuring that these participants comply with the terms and conditions of their release—are overwhelmed by the sheer number of people that they are required to manage. Consequently, many of these participants violate the terms and conditions of the parole, commit additional crimes, and then re-enter the corrections system.

Accordingly, a need exists for a system that reduces the management burden placed on parole officers and other law enforcement officials and enables parolees to comply with the terms and conditions of their parole.

SUMMARY

In one embodiment, a method of program transmission implemented by a computing device is provided. The method includes receiving participant data of a participant, where the participant data includes profile data and interaction data specific to the participant, and where the interaction data includes frequency data associated with how frequently the participant participated with one or more programming and completeness data associated with the one or more programming that the participant completed. In some embodiments, the method further includes making a comparison of the interaction data with an interaction threshold and determining, based on the comparison, whether the participant satisfies the interaction threshold with a first programming in a first format. The first format may correspond to a first supervision level. In some embodiments the method includes predicting a likelihood of the participant satisfying an additional interaction threshold associated with a second programming in a second format, in response to determining that the likelihood of the participant satisfying the additional interaction threshold exceeds a predetermined likelihood threshold, identifying the second programming in the second format for transmission to a participant device, the second format corresponding to a second supervision level that is lower than the first supervision level, and transmitting data related to the second programming in the second format to the participant device. Some embodiments may utilize a plurality of different levels and is not just limited to two.

In another embodiment, a system is provided. The system includes a processor, and a memory component that stores machine readable instructions that, when executed by the processor, causes the system to receive participant data of a participant, where the participant data includes profile data and interaction data specific to the participant, and where the interaction data includes frequency data and completeness data. In some embodiments, the instructions cause the system to compare the frequency data and the completeness data with an interaction threshold, determine whether the participant satisfies the interaction threshold with a first programming in a first format, the first format corresponding to a first supervision level, and predict a likelihood of the participant satisfying an additional interaction threshold associated with a second programming in a second format. In response to determining that the likelihood of the participant satisfying the additional interaction threshold exceeds a predetermined likelihood threshold, the instructions may cause the system to identify the second programming in the second format for transmission to a participant device, the second format corresponding to a second supervision level that is lower than the first supervision level, and transmit the second programming in the second format to the participant device.

In another embodiment, in a digital medium environment, a system of programming transmission implemented using an artificial intelligence neural network trained model is provided. The system includes a processor and a memory component that stores machine readable instructions that, when executed by the processor, causes the system to receive participant data of a participant, where the participant data includes profile data and interaction data specific to the participant and where the interaction data includes frequency data and completeness data. In some embodiments, the instructions cause the system to compare the frequency data and the completeness data with an interaction threshold, determine whether the participant satisfies the interaction threshold with a first programming in a first format, the first format corresponding to a first supervision level and predict a likelihood of the participant satisfying an additional interaction threshold associated with a second programming in a second format. In response to determining that the likelihood of the participant satisfying the additional interaction threshold exceeds a predetermined likelihood threshold, the instructions may cause the system to identify the second programming in the second format for transmission to a participant device, the second format corresponding to a second supervision level that is lower than the first supervision level, and transmit the second programming in the second format to the participant device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2B depicts weight factors that may be assigned to each of the categories described in FIG. 2A and to various formats in which the programming may be transmitted, according to one or more embodiments described and illustrated herein;

FIG. 5A depicts a user interface that may be accessed by the participant on the participant device, according to one or more embodiments described and illustrated herein;

FIG. 7B depicts a user interface that may be output on the remote computing device of the program administrator in response to the selection of the location profile option illustrated in FIGS. 6B and 7A, according to one or more embodiments described and illustrated herein;

DETAILED DESCRIPTION

The embodiments of the present disclosure are directed to systems and methods for program transmission. Specifically, these embodiments provide programming to a program participant. A participant of the program may include a parolee, an individual that is attending an addiction program, and/or other program participant. The programming may take include self-help programming, addiction programming, general educational training, etc. and may take any of a plurality of different forms, such as live classes, video classes, written materials, oral exams, written exams, and/or other formats. As such, these embodiments analyze interactions that the participant has with various types of programming to identify the types of programming that best suits the participant. In this way, the participants are provided access to a full suite of programming to facilitate a smooth transition to civilian life and reduce the likelihood of recidivism.

As part of a participant's terms and conditions of staying out of prison, they must attend or participate in education classes, group sessions, or read/watch content that helps them understand their unique situation and can help to point participants towards a path to because a productive citizen. These "programs" or "programming" comes in many forms, but is generally either face-to-face classes or sessions or comes in the form to be read (e.g., books, magazines, etc.) or viewed (e.g., downloaded video, streaming viewed, imagery, etc.). It can also be in the form of "self-help" online courses where content is presented and then quizzes/tests are electronically administered in an attempt to record the participant's attentiveness and if the content was understood. In some embodiments, the programming may include employment, safe place for day/night, under-employment job training, suicide prevention or other counseling.

Figure 1:
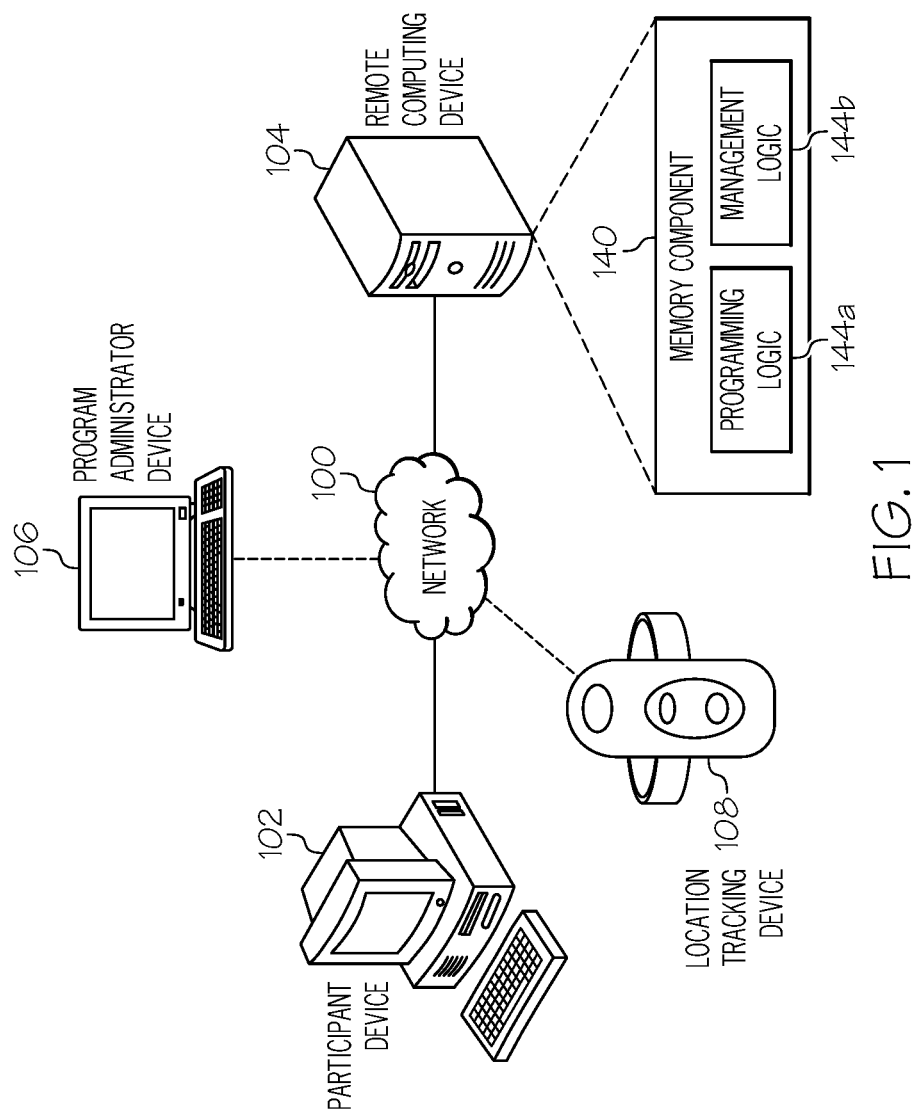
FIG. 1 depicts a computing environment for enabling program transmission, according to one or more embodiments described and illustrated herein.

Referring now to the drawings, FIG. 1 depicts a computing environment for program transmission, according to one or more embodiments described and illustrated herein. As illustrated, these embodiments include a network 100 coupled to a participant device 102, a remote computing device 104, a program administrator device 106, and a location tracking device 108.

The network 100 may include any wide area network (such as the internet, cellular network, mobile data network, WiMAX network, etc.), any local network (such as a local area network, Wi-Fi network, mesh network, etc.), and/or any peer-to-peer network (such as via Bluetooth, ZigBee, etc.). As such, the network 100 may be configured to facilitate communication between and among the participant device 102, the remote computing device 104, the location tracking device 108, and/or other devices coupled to the network 100.

The participant device 102 may be configured as any personal computer, laptop, mobile device (such as a smartphone), database, server, etc., for interfacing with a participant and thus may include input devices and output devices for facilitating such interface. The participant device 102 may be provided by the program and/or may be owned by the participant and may be configured for providing programming to the participant. In some embodiments, the participant device 102 may additionally track the participant's participation in a program and thus success in participating in the programming provided. It should be understood that while the example of FIG. 1 depicts a single participant device 102, this represents one or more participant devices for a plurality of different participants.

The remote computing device 104 may include a server, database, personal computer, tablet, mobile device, and/or other device for storing data as described in the present disclosure. As such, the remote computing device 104 may be configured to receive data from the participant device 102, the remote tracking device 104, and/or the program administrator device 106 and may provide programming, predict a participant's success for viewing particular programming and/or formats, and/or provide other functionality described herein.

To this end, the remote computing device 104 may include a memory component 140. That stores programming logic 144*a* and management logic 144*b*. The programming logic 144*a* may include an interactive virtual tutorials and lectures pertaining to a variety of topics. The interactive virtual tutorials may include an instructional video or tutorial followed by a test, which may include one or more multiple choice questions presented within a user interface output on a display of the participant's device. A participant may answer these questions by selecting one or more graphical representations positioned adjacent to the answers. Additionally, the memory component 140 may store lectures pertaining to various subject matters in a video format or an audio format. In contrast with the interactive virtual tutorials described above, programs in a video format may not have an interactive portion.

Similarly, the management logic 144b may be configured to cause the remote computing device 104 to provide a program platform to the participant device 102 and the program administrator device 106. The management logic 144b may additionally analyze actions by a participant via the participant device 102 and/or the location tracking device 108 to ensure that the participant is complying with the program requirements.

The memory component 140 may store programming logic 144a and management logic 144b. As described in more detail below, the programming logic 144a may be configured for causing a the remote computing device 104 to track and/or analyze interaction data of a participant with programming in a plurality of formats, and identify programming in certain formats for transmission to the participant device 102. The management logic 144b may be configured for causing the remote computing device 104 to generate a transmission schedule for delivering the digital content in certain formats.

The remote computing device 104, utilizing the management logic 144b, may be configured to detect and store, in real time, data relating to the participant's interaction with the interactive virtual tutorial. Specifically, the management logic 144b may cause the remote computing device 104 to perform the analysis to determine use of programming, and with other inputs, as well as determine the effectiveness of the programming, including deciding the next programming to offer to the participant. Additionally, the data may include an amount of time that the participant spent viewing aspects of the tutorial, the options the participant selected and/or deselected, the number of times the participant logged in and out of the program, websites that the participant visited while taking the test, etc. The remote computing device 104 may also access, in real time, a location of the participant device 102 by communicating with the participant device and/or the location tracking device 108.

The location tracking device 108 may be worn by the participant. The location tracking device 108 may be communicatively coupled to the participant device 102 and/or the remote computing device 104 via the network 100. The location tracking device 108 may be configured as a bracelet, anklet, and/or other device that is temporarily coupled to the participant's person; is not removable by the participant; and is configured to track the location of the participant. In some embodiments, the participant device 102 may serve as the location tracking device 108.

Figure 2A:
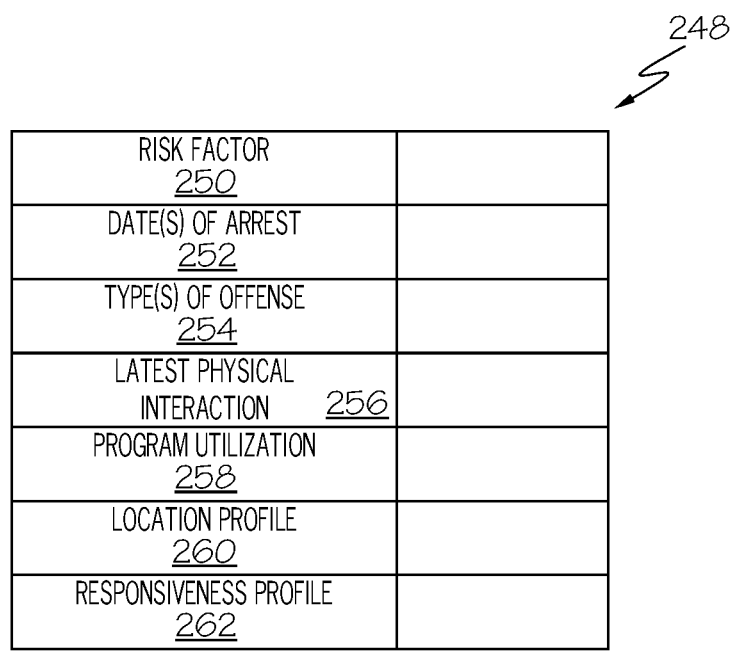
FIG. 2A depicts a participant profile that may be generated for a participant, according to one or more embodiments described and illustrated herein.

FIG. 2A depicts a participant profile 248 that may be generated for a participant, according to one or more embodiments described and illustrated herein. Specifically, a participant may include an individual that has been enrolled into a program, such as a parolee, someone entering into an alcohol rehabilitation, self-help program, etc. As such, the participant may be assigned a program administrator (or case manager), such as a parole officer or law enforcement official tasked with ensuring that the participant complies with the conditions of his parole. The program administrator may interact with the remote computing device 104 to generate a profile that is specific to the participant that he or she is tasked to manage. In some embodiments, the program administrator may also have the credentials to override the management logic 144b.

For example, the participant profile 248 may include a risk factor category 250, a dates of arrest category 252, a type of offense category 254 for which the participant may have served time at a penitentiary, a latest physical interaction category 256, which relates to the physical interaction that the participant may have with the program administrator, and a program utilization category 258, which relates to most recent program with which the participant interacted and the format of the content. The participant profile 248 may also include a location profile category 260, and a responsiveness profile category 262.

The dates of arrest category 252 may include a list of the dates, days, and/or times on which the participant may have been arrested. The type of offense category 254 may list one or more offenses classified as a felony, a misdemeanor, and/or a probation violation. This category may also include data describing the time served with respect to each offense.

The latest physical interaction category 256 may include physical interaction details such as notes describing a meeting between the program administrator and the participant. Additionally, these details may include a numeric score representing an assessment by the program administrator regarding whether the most recent physical interaction with the participant was pleasant and productive, or ineffective. Program utilization 258 may include details regarding the latest programming (e.g., digital content) with which the participant interacted and the format of the programming.

For example, the program utilization category 258 may list that the participant most recently viewed an orientation lecture that was transmitted to the participant device 102 in a video format. The value for the program utilization category 258 may be determined by the participant device 102 and/or the remote computing device 104 based on a determination of whether the programming was activated on the participant device 102, a periodic (and/or continuous) image scan (such as via an attached camera or other sensor) to ensure the participant was actually watching and/or listening to the programming based on prompts provided by the programming, and/or via other mechanisms.

Additionally, the location profile category 260 may provide details regarding various areas in which the participant was located within a specific period and the amount of time that the participant spent in each of these areas.

For example, this category may include coordinates and/or time stamp data, indicating that the participant spent two hours downtown, four hours driving on a highway near downtown, and a half an hour near a school zone. Some embodiments may generate a numeric value based on the location data of the participant. For example, a score of 90% may indicate that the participant substantially complied with location restrictions included in the terms of his program, while a score of 40% may indicate that the participant traveled to areas that the terms of his parole identified as exclusion zones with regular frequency.

The responsiveness profile category 262 may include participant response data. The participant response data may include a numeric score indicative of the responsiveness of the participant. Factors that affect this score may be whether and how often the participant picks up and responds to a surprise phone call made by the program administrator to the participant's mobile phone, whether the participant complies with the terms of his program and attends certain mandatory meetings, e.g., by traveling to a particular location on certain dates and times. Specifically, if the participant utilizes the participant device 102 to call the program administrator, that call may be tracked. Similarly, the participant device 102 (and/or the remote computing device 104) may track emails, text messages, and/or other communications from the participant device 102. Embodiments may also track if the participant calls the program administrator, but hangs up before the program administrator can answer.

In some embodiments, a numeric value for the risk factor category 250 may be determined by the remote computing device 104, based on information received for the other categories (252-262) provided in FIG. 2A. Specifically, values for the risk factor category 250 may be determined based on the severity of the crime for which the participant may have been convicted, the date(s) of arrest (e.g., the closer in time may increase the risk factor 250). In some embodiments, the weightings of the information in FIG. 2A may be manipulated by the program administrator, such that different types of information may affect the risk factor 250 differently.

It is noted that, upon initially creating a profile for a participant, the participant may be transmitted a default set of programming in multiple formats. Thereafter, based on the participant's interaction with each of the programming, the remote computing device 104 and/or the participant device 102 may obtain interaction data, analyze the data, identify the participant's format preferences, and modify the profile of the participant. The profile modification may occur in real time.

FIG. 2B depicts weight factors that may be assigned to the categories 250-262 described in FIG. 2A and to various formats in which the programming may be transmitted, according to one or more embodiments described and illustrated herein. As illustrated, categories 250-262 from FIG. 2A may be provided in a category section 265 of a table 264. The program administrator may utilize the table 264 to assign weight factors for each of the categories 250-262. The categories 250-262 may be associated with respective weight factors in a weight factor section 266 such as, 10%, 20%, 50%, etc. The weight factor may be representative of the importance of the category and the importance of data associated with the category for that particular program or program administrator.

In some embodiments, another table 267 may include a program format section 268 and a weight factor section 270, in which a plurality of formats (such as a video format 272, an audio format 274, an interactive virtual tutorial format 276, and/or an in-person meeting format 278) may be assigned respective weight factors, such as, 10%, 20%, 50%, etc. Once the weight factors are set for the categories 250-262 and the formats 272-278, the remote computing device 104 may analyze interaction data by the participant. As an example, the remote computing device 104 may determine that the participant frequently views interactive virtual tutorials and regularly completes the assignments included as part of these tutorials, but rarely listens to or completes listening to lectures in video format 272 and audio format 274. In such an example, the remote computing device 104 may assign a larger effectiveness score to the interactive virtual tutorial format 276 as compared the video format 272 and audio format 274. In embodiments, the program administrator may mandate that the participant attend in-person meetings, and as such, the weight factor assigned to the in-person meeting format 278 may be high. If the participant fails to attend a predetermined number of mandatory in-person meetings, these embodiments may generate and transmit a message to the program administrator device 106 and a warning message to the participant device 102. Consequently, the remote computing device 104 may initiate an automated communication to the participant device 102, and/or the program administrator may manually make a phone call to the participant device 102 in order to instruct the participant to adhere to parole terms of the program. As will be understood, this information may be used as inputs to the management logic 144b

Figure 3:
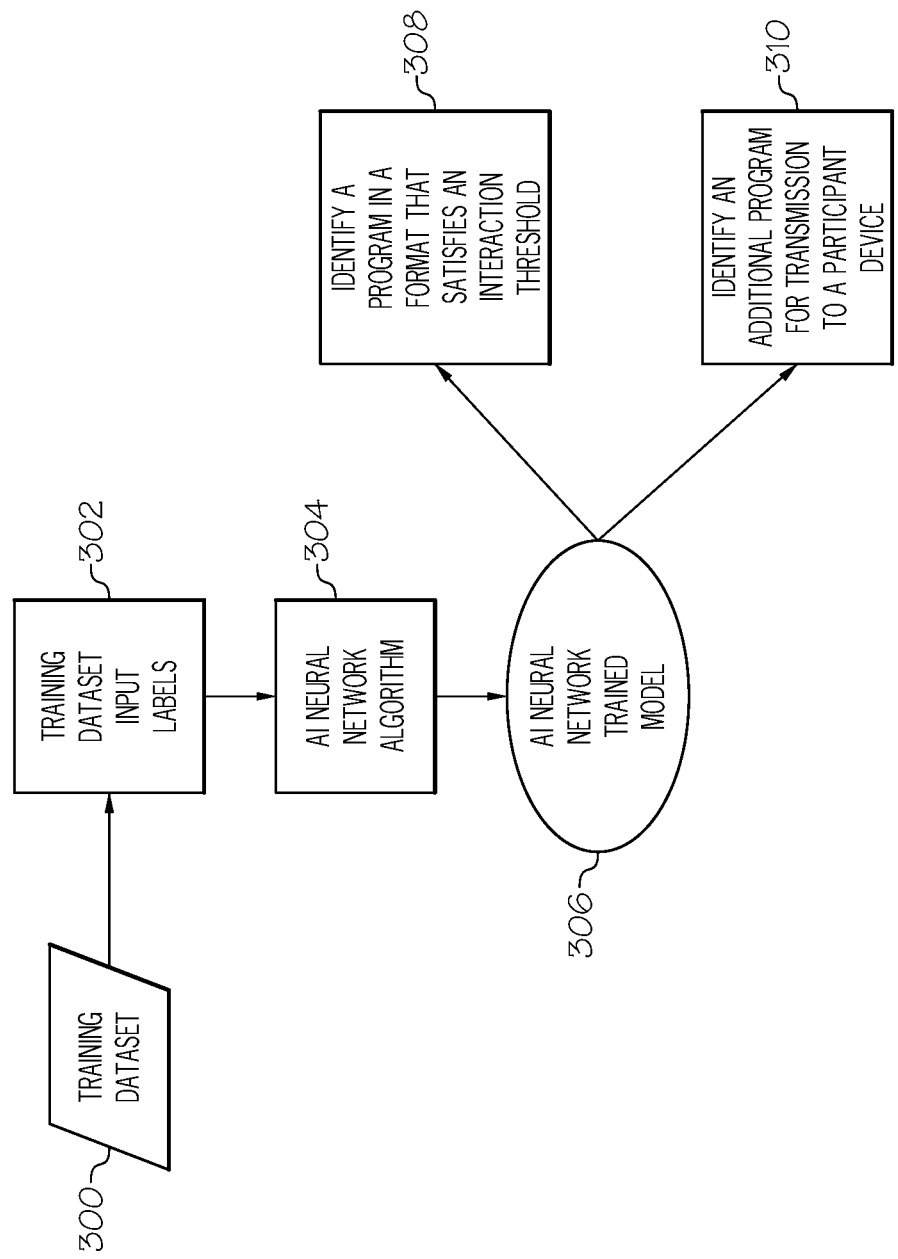
FIG. 3 depicts a flowchart to identify programming in particular formats based on historical participant interaction data and participant profile data, and transmit the identified programming in the identified formats in a targeted manner, according to one or more embodiments described and illustrated herein.

FIG. 3 depicts a flowchart for training an artificial intelligence neural network model, which is part of the management logic 144b, to identify programming in particular formats based on interaction data and profile data of a participant, according to one or more embodiments described and illustrated herein. As illustrated in block 300, a training dataset is determined, which may include training data in the form of participant interaction data, location data, time stamp data, programming data, programming format data, parole conditions data, parole violations data, etc., associated with one or more participants. Each of these participants may have different profiles, committed offenses of varying degrees of severity, etc. In some embodiments, the training dataset includes this information for hundreds or thousands of participants and/or program administrators. In block 302, the data included within the training data set may be labeled with input labels such that some of the data may be labeled as images, while other may be labeled as videos, text files, coordinates, and so forth. In block 302, the training data set is transformed from raw unstructured data to structured and categorized data. Specifically, the neural network may input the data to determine likely outcomes for future events, based on data input regarding past actions and the consequences from those actions.

As such, in block 304 and block 306, the artificial intelligence neural network algorithm of the management logic 144b may be utilized to train a model on the training dataset with the input labels. As stated, all or parts of the training dataset may be raw data in the form of images, text, files, videos, and so forth, that may be processed and organized. Such processing and organization may include adding dataset input labels to the raw data so that an artificial intelligence neural network based model may be trained using the labeled training dataset.

One or more artificial neural networks (ANNs) used for training the artificial intelligence neural network based model and the artificial intelligence neural network algorithm may include connections between nodes that form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error.

In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling.

Additionally, one or more ANN models may be utilized to generate results as described in embodiments herein. Such ANN models may include artificial intelligence components selected from the group that may include, but not be limited to, an artificial intelligence engine, Bayesian inference engine, and a decision-making engine, and may have an adaptive learning engine further comprising a deep neural network learning engine. The one or more ANN models may employ a combination of artificial intelligence techniques, such as, but not limited to, Deep Learning, Random Forest Classifiers, Feature extraction from audio, images, clustering algorithms, or combinations thereof.

In some embodiments, a convolutional neural network (CNN) may be utilized. For example, a CNN may be used as an ANN that, in a field of machine learning, for example, is a class of deep, feed-forward ANNs that may be applied for audio-visual analysis. CNNs may be shift or space invariant and utilize shared-weight architecture and translation invariance characteristics. Additionally or alternatively, a recurrent neural network (RNN) may be used as an ANN that is a feedback neural network. RNNs may use an internal memory state to process variable length sequences of inputs to generate one or more outputs. In RNNs, connections between nodes may form a DAG along a temporal sequence. One or more different types of RNNs may be used such as a standard RNN, a Long Short Term Memory (LSTM) RNN architecture, and/or a Gated Recurrent Unit RNN architecture. Upon adequately training the artificial intelligence neural network trained model, the embodiments may utilize this model to perform various actions.

Specifically, in block 308 and block 310, the remote computing device 104 may utilize the artificial neural network trained model of the management logic 144b to identify programming in a format that satisfies an interaction threshold and identify additional programming for transmission to a user device in an additional format. For example, the remote computing device 104, via the artificial intelligence neural network trained model, may identify programming transmitted in the interactive virtual tutorial format 276 (e.g., an online course), which is a format that the participant regularly views. The remote computing device 104 may also determine that the participant tends to satisfactorily complete all of the requirements (e.g., test, surveys, etc.) included within the interactive virtual tutorials. Consequently, the remote computing device 104 may, using the artificial intelligence neural network trained model, identify additional digital programming pertaining to different topics (e.g., other online courses) and deliver programming in the interactive virtual tutorial format 276.

Based on data and analysis indicating that the participant has a preference for and tends to regularly view and complete subject matter in the interactive virtual tutorial format 276, the remote computing device 104 may identify programming in formats that requires less supervision relative to the interactive virtual tutorial format 276. For example, the remote computing device 104 may identify programming for transmission in the video format 272 or the audio format 274. This programming may not require an exam and also may not require supervision from a program administrator. As such, this digital programming require less supervision. It should be understood that these embodiments may be implemented as recommendations to the case manager versus automatically delivered to the participant. In other words, these embodiments may perform one or more of the following: recommend programming to the supervisor or automatically deliver to the participant.

Figure 4:
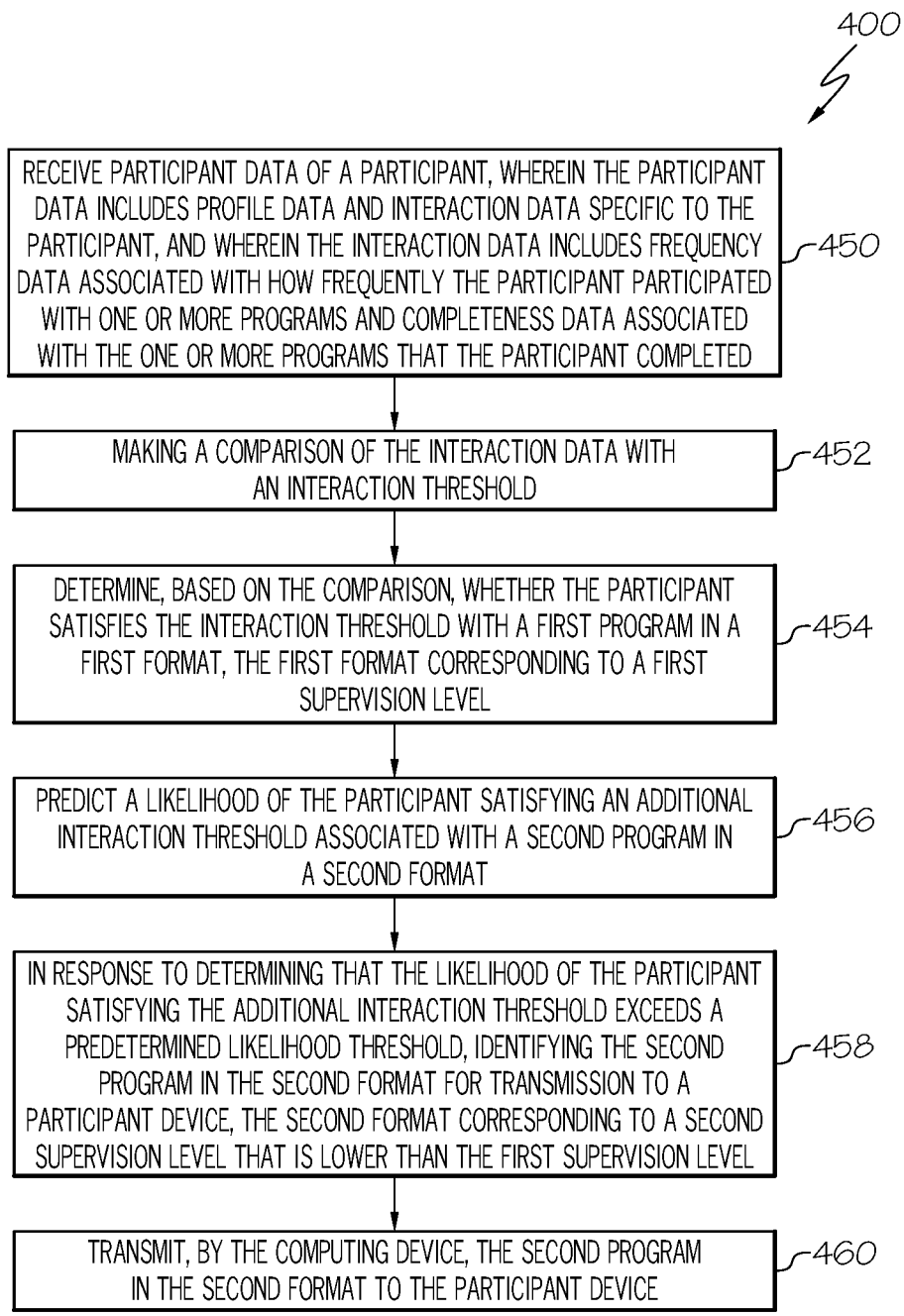
FIG. 4 depicts a flowchart for identifying programming in particular formats based on historical participant interaction data and participant profile data, and transmitting the identified programming in the particular formats in a targeted manner, according to one or more embodiments described and illustrated herein.

FIG. 4 depicts a flowchart 400 for identifying programming in particular formats based on interaction data and profile data of a participant, and transmitting the identified programming in the particular formats in a targeted manner, according to one or more embodiments described and illustrated herein. As illustrated in block 450, participant data of a participant may be received. The participant data includes profile data and interaction data specific to the participant. The interaction data includes frequency data associated with how frequently the participant participated in one or more programming and completeness data associated with the one or more programming that the participant completed. The profile data may include one or more of employment data, criminal record data, and/or other data.

In block 452, the interaction data is compared with an interaction threshold. The interaction data includes frequency data and the completeness data, each of which may be compared with the interaction threshold. The frequency data may be based on a number of times the participant interacts with one or more programming in each of the plurality of formats. The completeness data may be based on a completion level of the participant associated with one or more programming in each of the formats. The interaction threshold may represent criteria for fulfilling the current level of supervision.

While some embodiments may be configured such that the participant needs to complete five (5) digital classes and pass the test (for example), some embodiments may be configured such that if the participant does not attend digital classes as required, but has shown that he or she will attend in-person classes, the recommendation might be for the digital classes, but then modified to in-person classes. Similarly, some embodiments may require the participant to participate in a plurality of different formats. One example might include a recommendation that the participant attend five (5) digital classes or four (4) in-person classes and read one digital book.

Similarly, some embodiments first determine the amount of time the participant needs to invest and may then calculate options for programing. As an example, the participant may be required to spend ten (10) hours per week on programming. As such, the participant may be provided with options for programming in a plurality of different formats. The participant may then select the programming he/she desires, so long as the time threshold is met.

In block 454, a determination may be made regarding whether the participant satisfies the interaction threshold with a first programming in a first format. The first format may correspond to a first supervision level. The plurality of programming may correspond to an online course, an online lesson, or a mandatory virtual meeting and the plurality of formats may correspond to the interactive virtual tutorial format 276, the video format 272, the audio format 274, or the in-person meeting format 278.

In block 456, a likelihood of the participant satisfying an additional interaction threshold associated with a second programming in a second format may be predicted. The remote computing device 104 may analyze (in some embodiments using the artificial intelligence neural network trained model) profile data and interaction data of the participant to determine the preferences of the participant with respect to programming in various format. For example, some embodiments may be configured to first analyze other participants that have similar values for the categories 250-262 listed in FIG. 2A to determine which types of programming formats were most successful with those participants. Additionally, these embodiments may then determine triggers for this participant. If the participant did not complete high school, inferences may be made regarding whether in-person classes would be effective for this particular participant.

Similarly, if the participant has previously performed well (or poorly) in certain formats, this is also considered. Based on this historical data, as well as using the background data for this participant, the remote computing device 104 may determine an additional likelihood (such as a probability) that the participant will be successful with the recommended programming format. Additionally, the remote computing device 104 may determine whether a different programming format would be more successful and provide the likelihood of success for the recommended format. In some embodiments, this prediction may be based on how successful the participant currently is with the programming formats being provided.

For example, if the frequency data and/or the completeness data indicate that the participant has attended in-person classes with regularity and has completed all of the tests and assignments administered in these classes, the remote computing device 104 may predict that the likelihood the participant satisfies an interaction threshold associated with another programming, such as an online course, may be high. In some embodiments, the remote computing device 104 may determine such a likelihood of the participant succeeding in participating in the online course by analyzing the frequency data and/or the completeness data that is specific to the participant in addition to analyzing frequency data and completeness data associated with a number of other participants, each of whom may have different employment histories, may be convicted of crimes of varying degrees of severity, etc. For example, an analysis of the frequency data and completeness data associated with other participants may indicate that 80% of the participants that have attended all of the mandatory in-person classes and completed all of the exams and assignments administered in these classes, tend to regularly interact with and complete all of the assignments of digital classes.

Additionally, an analysis of the frequency data and completeness data associated with the digital classes may indicate that only 90% of the participants that regularly interact with and successfully complete all of the assignments of the digital classes, tend to also view programming in the video format 272. In embodiments, the analysis may further indicate that only 30% of the participants that regularly interact with and successfully complete all of the assignments of the digital classes tend to view programming in the audio format 274. Such robust analysis may enable the remote computing device 104 to determine the programming and programming formats with which the participant is most likely to interact, thereby enabling the targeted transmission of programming to the participant device 102 that is tailored to the format preferences of the participant.

In block 458, in response to determining that the likelihood of the participant satisfying the additional interaction threshold exceeds a predetermined likelihood threshold, the second programming in the second format may be identified for transmission to the participant device 102. The second format may correspond to a second supervision level that is lower than the first supervision level. In embodiments, the second supervision may be associated with the participant interacting with the second programming in the second format independent of a supervising official. In contrast, the first supervision level is associated with a supervising official interacting with the first programming in the first format simultaneously with the participant interacting with the first program in the first format.

In block 460, data related to the second programming in the second format may be transmitted to the participant device 102. In embodiments, the remote computing device 104 may transmit the second programming in the second format to the participant device 102. It should be understood that, in some embodiments, a supervisor may be provided with the ability to override the system via an option provided by the management logic 144b.

FIG. 5A depicts a user interface 500 that may be accessed by the participant on the participant device 102, according to one or more embodiments described and illustrated herein. For example, the user interface 500 may include a program options section 502 and a program format selection section 504. Both of these sections may include a plurality of selectable options associated with programming that the participant may enroll to compete his/her program. The participant may select a programming by choosing a selectable option corresponding to the programming and choose a format in which he/she may prefer to view the programming. For example, the participant may choose to view an online course relating to employment assistance in an interactive virtual tutorial format 276.

In some embodiments, the programming offered to the participant may be geared towards assisting the participant to complete certain requirements within a certain period of time. For example, the participant may be required to complete 10 hours of programming per week, of which 3 hours must be completed in video format 272 or audio format 274. Based on these requirements, the participant may be displayed a list of program options and formats associated with these program options. The participant may then select the programming that best enables him or her to complete the requirements within the specified time period.

Figure 5B:
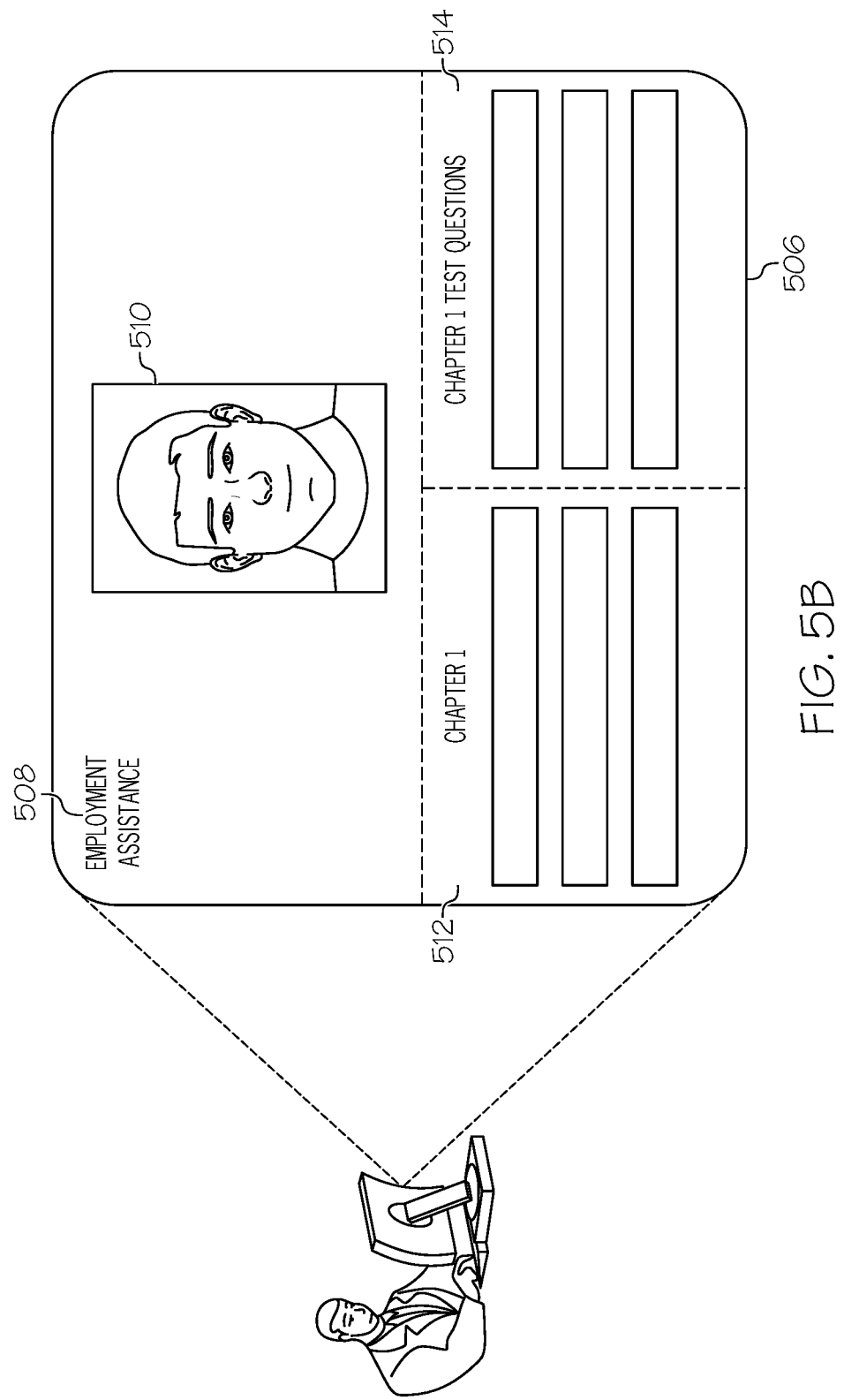
FIG. 5B depicts a user interface of a programming with which the participant may be interacting, according to one or more embodiments described and illustrated herein.

FIG. 5B depicts a user interface 506 of a programming with which the participant may be interacting, according to one or more embodiments described and illustrated herein. As illustrated, a user interface 506 may be provided by the participant device 102. The user interface 506 may be associated with an online course titled employment assistance 508, which a participant may have selected or which may have been assigned to the participant. The course may include a lecture portion delivered by a teacher (e.g., the program administrator or other third party) via the video conference portion 510. The user interface 506 may also include a chapter section 512, which may list the current chapter being discussed by the teacher 510 and a test portion 514, which may display various test questions pertinent to the information provided in the chapter section 512.

Various interactions that the participant has with the user interface 506 may be tracked and stored in real time. For example, portions of the user interface 506 that the participant selects, e.g., one or more options displayed in each of the chapter section 512 and the test portion 514, the amount of time that the participant spends viewing a particular chapter, taking a test, etc., may be recorded as interaction data. The interaction data may be stored by the participant device 102 and/or the remote computing device 104. The interaction data may include frequency data and completion data associated with the online course.

Figure 6A:
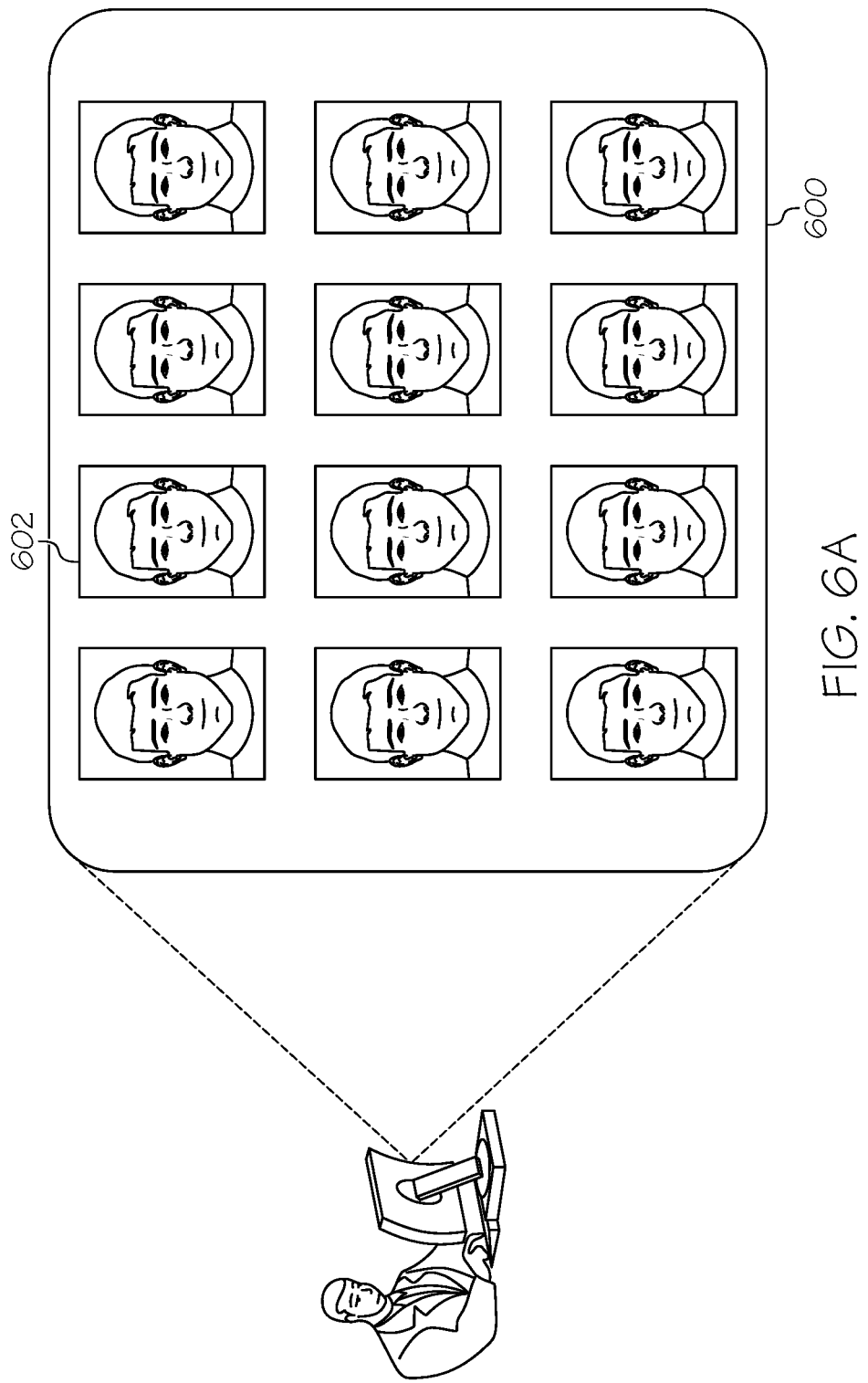
FIG. 6A depicts a user interface that may be output on a display of the program administrator device, according to one or more embodiments described and illustrated herein.

FIG. 6A depicts a user interface 600 that may be provided by the program administrator device 106 and/or case manager, according to one or more embodiments described and illustrated herein. The user interface 600 may include thumbnails of each of the participants that the program administrator is currently managing. Under each thumbnail, various details regarding a participant may be provided such as the name, address, participant number, etc. The program administrator may be able to view and/or modify each of these details by selecting text fields in which these details are displayed. Additionally, the program administrator may select one or more of these thumbnails and view various additional details about the participant. For example, the program administrator may select a participant thumbnail 602.

Figure 6B:
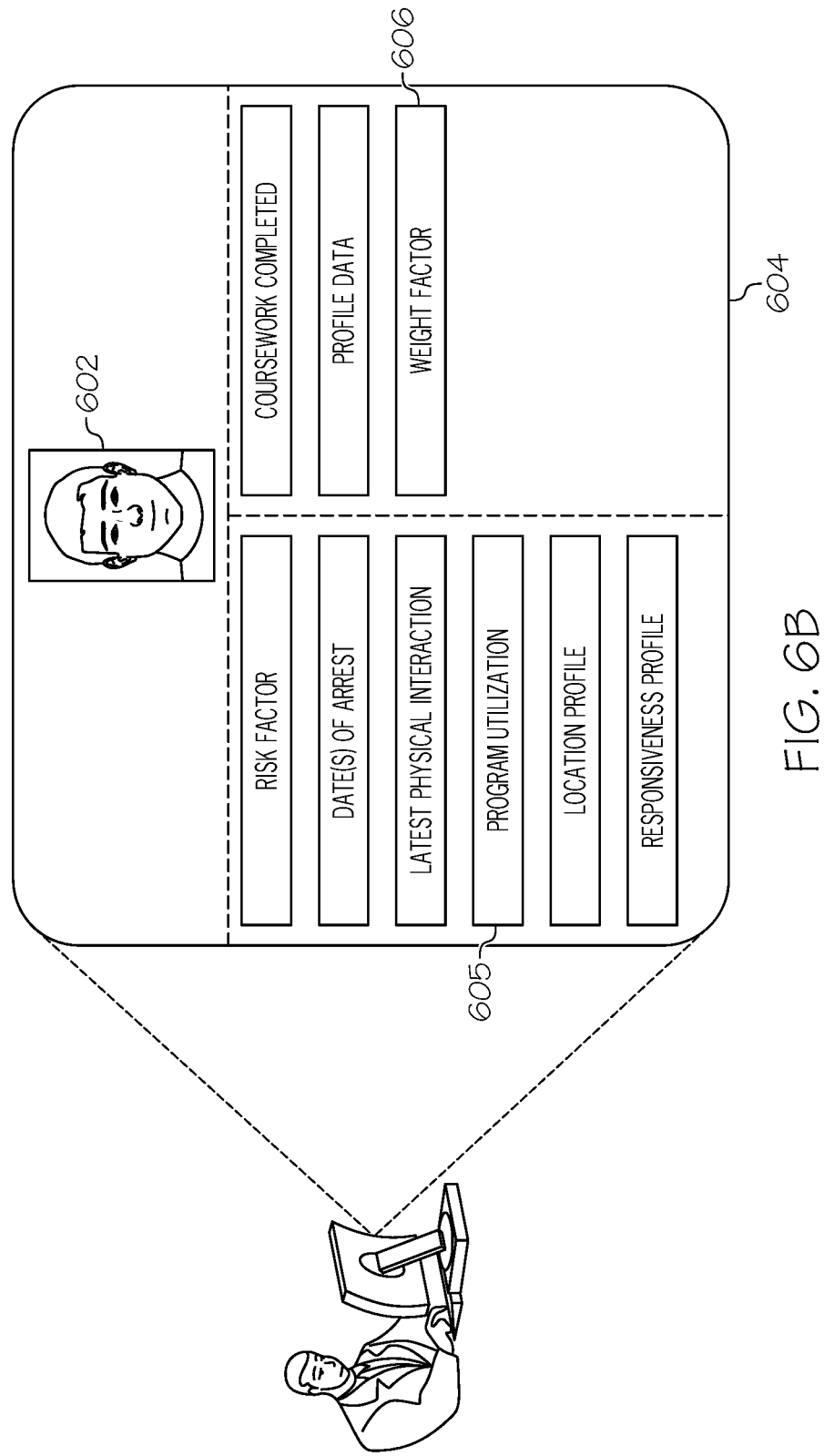
FIG. 6B depicts a user interface that may be output on the display of the remote computing device in response to the selection of the participant thumbnail, according to one or more embodiments described and illustrated herein.

FIG. 6B depicts a user interface 604 that may be provided by the program administrator device 106 in response to the selection of the participant thumbnail 602 of FIG. 6A, according to one or more embodiments described and illustrated herein. As illustrated, in response to the selection, the user interface 604 may include a profile page specific to the participant. The profile page may include a plurality of interactive options corresponding to the categories illustrated in FIGS. 2A and 2B. The program administrator may select any of these options and view details about the participant such as the dates of his arrest, his responsiveness profile, coursework completed, etc.

Additionally, the program administrator may view the participant's profile data, which may list his employment history, medical history, residential history, etc. The program administrator may also select the program utilization option 605, in response to which details regarding the programming that the participant has participated in and completed and the formats of such programming may be displayed. The program administrator may also have the ability to modify one or more parameters within each of these categories. For example, the program administrator may select the weight factor option 606 and modify the weight factors for one or more of the categories and program formats listed in FIG. 2B.

Figure 6C:
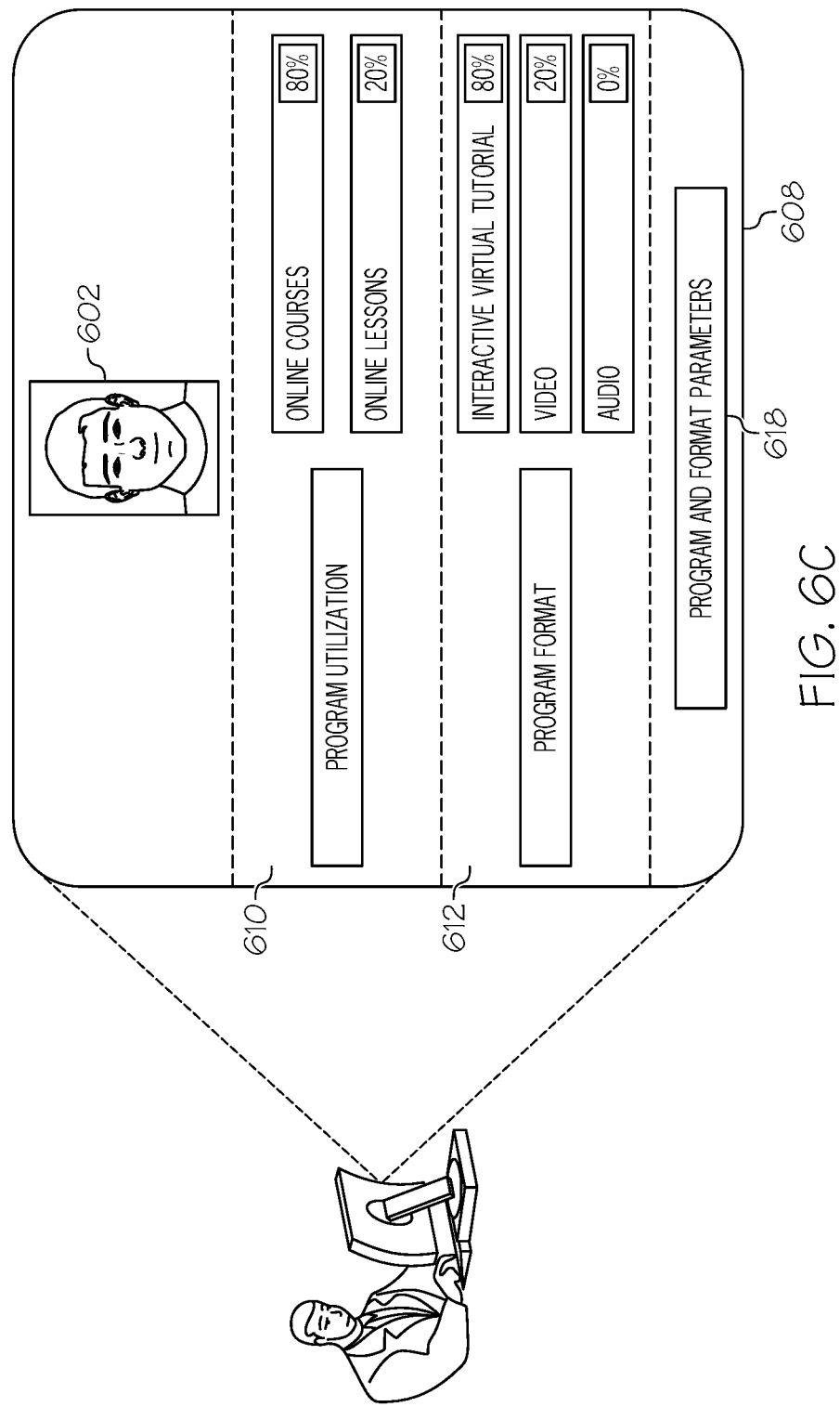
FIG. 6C depicts a user interface that displays data related to programs with which the participant has interacted, according to one or more embodiments described and illustrated herein.

FIG. 6C depicts a user interface 608 that provides data related to programs with which the participant has interacted, according to one or more embodiments described and illustrated herein. Upon selecting the program utilization option 605, the user interface 608 may be provided. The user interface 608 may include a program utilization section 610 and a program format section 612. The program utilization section 610 may list various types of programming with which the participant has interacted, such as online courses and online lessons, and percentage values associated with each of these programming. As illustrated, the percentage value of 80% shown adjacent to online courses indicates that online courses represent 80% of all of the programming with which the participant has interacted, while the percentage of 20% may indicate that online lessons represent 20% of all of the programming with which the participant has interacted. In embodiments, data regarding a completion percentage of each of the online courses and the online lessons with which the participant has interacted may also be displayed on the user interface 608. Additionally, the program format section 612 may list percentage values associated with various programming formats.

For example, the interactive virtual tutorial format 276 may have a percentage value of 80% displayed adjacent to it, indicating that 80% of the programming with which the participant has interacted were accessed by participant or transmitted to the participant device 102 of the participant in the interactive virtual tutorial format 276. By contrast, 20% of the programming with which the participant interacted may have been in the video format 272. Additionally, the participant may not have viewed any programs in audio format 274, as indicated the 0%. In this way, the program administrator may be provided an indication of the programming and format preferences of the participant. In some embodiments, the program administrator may select the program and format parameters option 618 and be provided with a list of parameters that may be modified.

The percentages displayed adjacent to the programming and programming formats may be based on frequency data and completeness data, which may be automatically tracked with respect to various types of programming with which the participant interacts. The frequency data may track a number of times during a certain time frame that the participant may have interacted with various online courses in the interactive virtual tutorial format 276 as compared to a number of times during the same time frame that the participant may have interacted with online lessons in the video format 272. Additionally, the completeness data may be associated with a percentage of an online course that the participant has completed, which may be based on whether the participant has viewed all of the lectures included in the course in addition to completing any tests and assignments included within the course, etc. All of this data may be stored locally in the participant device 102, in addition to being stored in the remote computing device 104, and/or in one or more cloud servers that are external to the participant device 102 and the remote computing device 104.

Figure 6D:
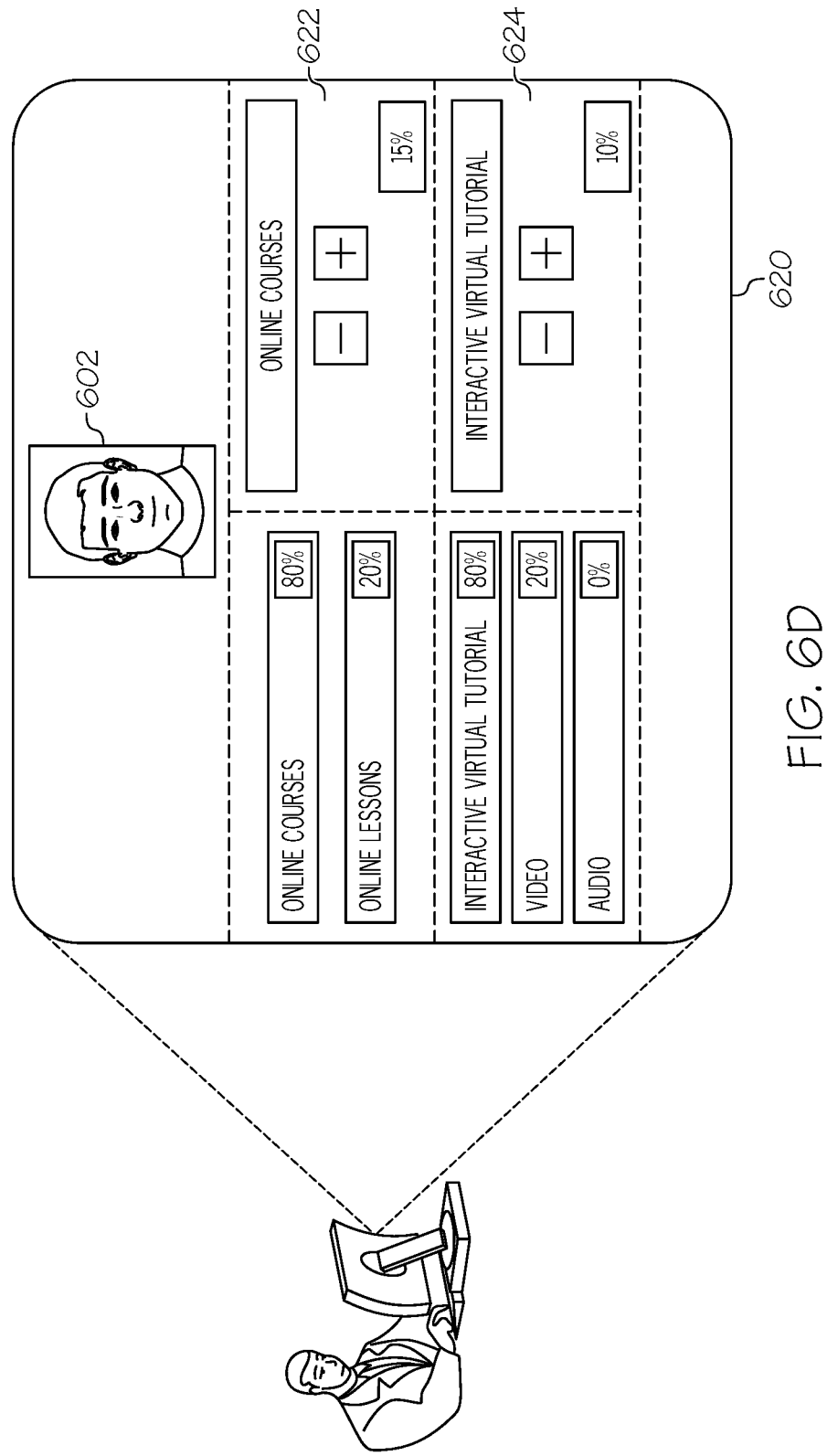
FIG. 6D depicts a user interface that displays programming with format percentages and parameter values associated with various programming and programming formats, according to one or more embodiments described and illustrated herein.

FIG. 6D depicts a user interface 620 that provides programming and format percentages, and parameter values associated with various programming and programming formats, according to one or more embodiments described and illustrated herein. As illustrated, the user interface 620 includes a program parameter section 622 and a format parameter section 624. As the participant may have a preference for viewing online courses in the interactive virtual tutorial format 276, the program administrator may increase the percentage of online courses that are transmitted to the participant by 15%, in addition to increasing the percentage of a certain format in which programming is delivered, namely the interactive virtual tutorial format 276, by 10%. In this way, the program administrator may modify programming parameters and format parameters to enable the participant to interact with programming according to the participant's preferences.

In some embodiments, the participants may have varying employment histories, criminal records, live in different parts of the country, have varying participant preferences, etc. The remote computing device 104 may, using the artificial intelligence neural network trained model, analyze the frequency data and completeness data associated with these participants and predict respective likelihoods of these participants satisfying different interaction thresholds associated with various programming. In this way, the remote computing device 104 may leverage the artificial intelligence neural network trained model to determine, simultaneously and in real time, whether a vast number of participants (e.g., hundreds or thousands of participants) may be able to satisfy different thresholds associated with various types of programming and programming formats. Determining such threshold calculations manually would be burdensome and highly impractical.

Figure 7A:
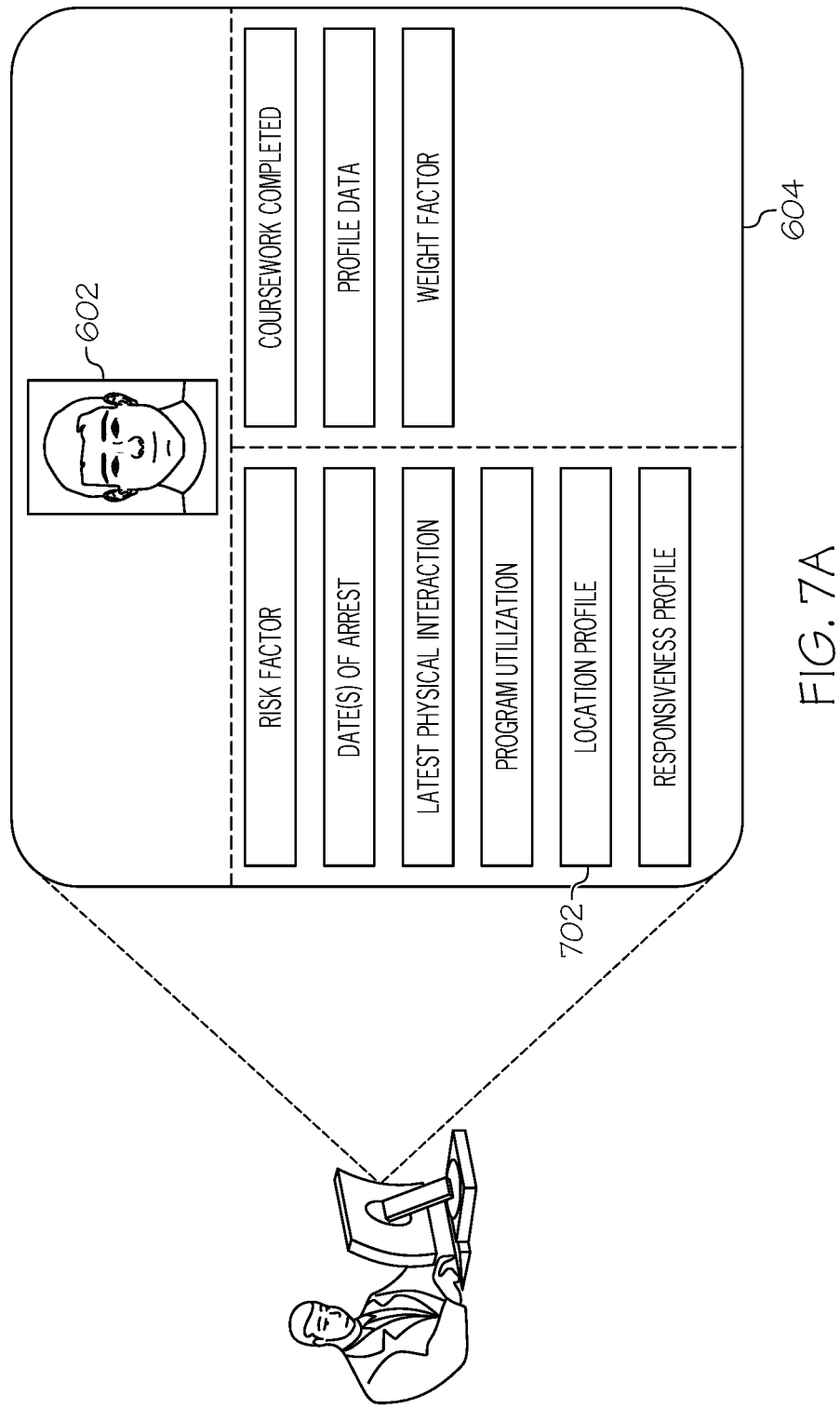
FIG. 7A depicts the program administrator selecting the location profile option from the user interface as illustrated in FIG. 6B, according to one or more embodiments described and illustrated herein.

FIG. 7A depicts the program administrator selecting the location profile option 702 from the user interface 604 as illustrated in FIG. 6B, according to one or more embodiments described and illustrated herein. In particular, the program administrator may select the location profile option 702 in order to view, in real time, the location of the participant. Additionally, upon selecting the location profile option 702, various location details specific to the participant over a certain time frame may be displayed to the program administrator.

FIG. 7B depicts a user interface 704 that may be provided in response to the selection of the location profile option 702 illustrated in FIGS. 6B and 7A, according to one or more embodiments described and illustrated herein. FIG. 7B may provide, in real time, a map 710 of an area of the current location of the participant. The map 710 may include location pins 712 and 714, which may be interactive options representing a current location of the participant and one or more locations to which the participant may have travelled on a particular day. In embodiments, the location pin 712 and the location pin 714 may be color coded to indicate whether the locations to which the participant traveled were within an inclusion zone or an exclusion zone. Additionally, the user interface 704 may include a location history option that, when selected by the program administrator, may provide location data associated with the participant over a certain time frame, e.g., one week, one month, one year, etc.

The user interface 704 may also include options associated with exclusion zones and inclusion zones. The program administrator may modify the exclusion zones and inclusion zones specific to the participant by selecting the options associated with exclusion zones and inclusion zones included in the user interface 704. For example, options may be provided for the program administrator to adjust the exclusion zones or inclusion zones specific to the participant by inputting addresses, and modifying zip codes, counties, districts, cities, etc. Additionally, upon selecting the exclusion zones and inclusion zones, the program administrator may also access data of a number of times that a participant was located in exclusion zones and inclusion zones, and for the length of time that the participant spent in inclusion and exclusion zones.

The program administrator may also select options associated with exclusion zone exceptions and exclusion zone proximity alerts and change various parameters. For example, the program administrator may select the option associated with exclusion zone exceptions and disable an automatic transmission of an alert to the participant device 102 if the participant is found adjacent to a specific elementary school. Such an alert may be disabled because the participant may have a child that is currently attending an elementary school within the exclusion zone, and as such, may have a legitimate reason to travel to the school. However, the exception may be time bound such that it may only apply on Mondays, Wednesdays, and Friday, from 8:00 AM EST to 10:00 AM EST from 2:30 PM EST to 4:30 PM EST. In other words, the exception may only be applicable during times when children are transported to and from the elementary school, and on the days on which the participant has custody of the child.

Additionally, the program administrator may select the option associated with exclusion zone proximity alerts and enable an alert to be automatically transmitted from the remote computing device 104 to the participant if the participant is within, e.g., 500 feet or 1 mile of an exclusion zone. If the participant travels to within 500 feet of the exclusion zone, the remote computing device 104 may, automatically and without user intervention, transmit a text message to the participant device 102, instructing him to call the program administrator as soon as possible and provide reasons for his presence in the exclusion zone. In some embodiments, an automated call may be made from the remote computing device 104 to the participant device 102, instructing the participant to contact the program administrator immediately and explain his presence in the exclusion zone.

Figure 7C:
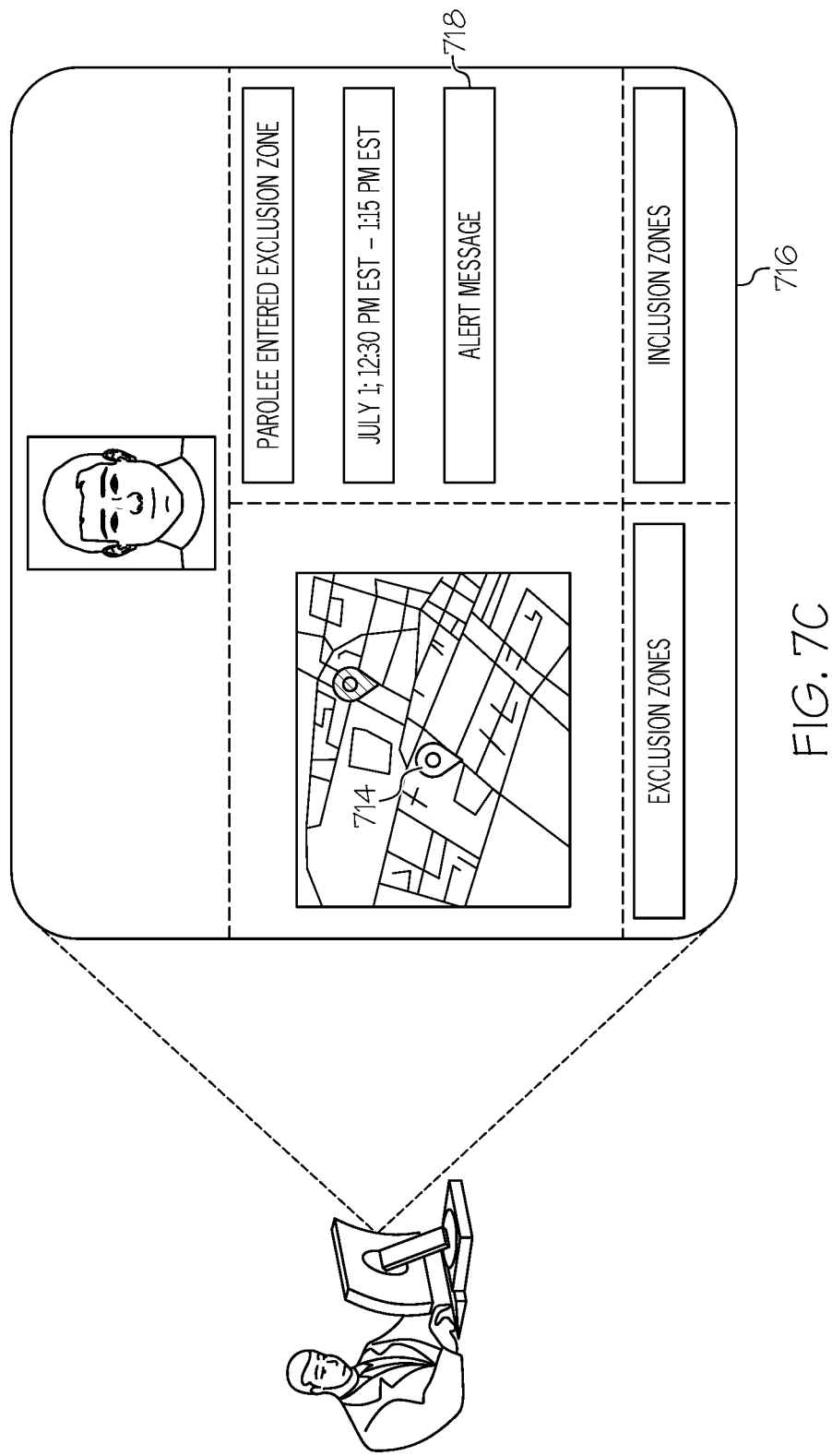
FIG. 7C depicts a user interface that displays data regarding an instance in which the participant was located in an exclusion zone, according to one or more embodiments described and illustrated herein.

FIG. 7C depicts a user interface 716 that provides data regarding an instance in which the participant was located in an exclusion zone, according to one or more embodiments described and illustrated herein. As illustrated, the program administrator may select the location pin 714, which may be displayed in red to indicate that the parole was located in an exclusion zone. For example, upon selecting the location pin 714, the user interface 716 may display details such as the participant entered an exclusion zone on July 1 and remained in the exclusion zone for 45 minutes. Other details may also be displayed, such as information indicating that the location to which the participant traveled was in an exclusion zone because the terms of his parole indicated that he was not permitted to travel within 1000 feet of an elementary school or a high school.

The program administrator may have the option of sending an alert message by selecting the alert message option 718. For example, upon selecting the alert message option 718, a text message may automatically be sent to a smartphone of the participant. The text message may instruct the participant to contact the program administrator immediately and inform him of the reasons why the participant traveled to an exclusion zone. Upon selecting the alert message option 718, an automated telephone call may also be made from the remote computing device 104 of the program administrator to the smartphone of the participant. Upon selecting the alert message option 718, a mandatory meeting request may be transmitted from the remote computing device 104 to the participant device 102. The mandatory-meeting request may be a message instructing the participant that a meeting between him and the program administrator may be scheduled because the participant was located in the exclusion zone.

Depending on a number of times the participant enters an exclusion zone, the remote computing device 104 may, using the artificial intelligence neural network trained model, modify the risk factor 250 specific to the participant. For example, if the participant is identified as entering exclusion zones above a certain threshold number of times, the risk factor 250 that is specific to the participant may automatically be increased by a certain percentage. Additionally, based on the updated risk factor 250, various parameters within the category of program utilization may be updated. For example, programming that is related to informing the participant about the importance of avoiding exclusion zones and the adverse effects of entering exclusion zones on a regularly basis, which constitutes a clear violation of the terms and conditions of the participant's parole, may be transmitted to the participant device 102. It should be understood that the embodiments of FIGS. 7A, 7B, and 7C provide zone and zone violations. In some embodiments, this data may be used as inputs to the artificial intelligence engine that determines and/or recommends programming to the participant in the future, as well as to other participants. Additionally, some embodiments are configured create and send supervisor notifications if the participant frequents known trouble spots, based on the location tracking. This history may be maintained and input into the AI engine to assist in programming decision making.

Figure 8:
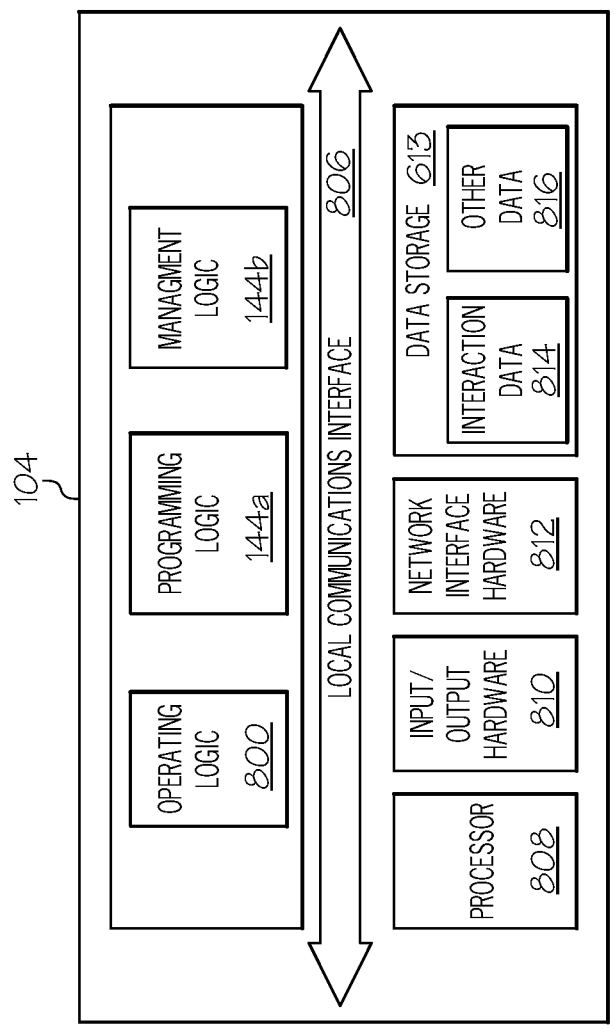
FIG. 8 depicts a remote computing device for providing program transmission, according to one or more embodiments described and illustrated herein.

FIG. 8 depicts the components of the remote computing device 104, according to one or more embodiments described and illustrated herein. As illustrated, the remote computing device 104 includes a processor 808, input/output hardware 810, a network interface hardware 812, a data storage component 813 (which stores interaction data 814 and/or other data 816 as described with reference to FIGS. 2A-7C), and a memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable mediums may reside within the remote computing device 104 and/or external to the remote computing device 104.

The memory component 140 may store operating logic 800, the programming logic 144a, and the management logic 144b. Each of these logic components may include a plurality of different pieces of logic, each of which may be embodied as a computer program, firmware, and/or hardware, as an example. A local communication interface 806 is also included in FIG. 8 and may be implemented as a bus or other communication interface to facilitate communication among the components of the remote computing device 104.

The processor 808 may include any processing component operable to receive and execute instructions (such as from a data storage component 813 and/or the memory component 140). As described above, the input/output hardware 810 may include and/or be configured to interface with speakers, microphones, and/or other input/output components.

The network interface hardware 812 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the remote computing device 104 and other computing devices.

The operating logic 800 may include an operating system and/or other software for managing components of the remote computing device 104. As discussed above, the programming logic 144a may reside in the memory component 140 and may be configured to cause the processor 808 to store and initiate the transmission of programming in various formats, as described herein. The management logic 144b may be configured for causing a computing device (such as the participant device 102 and the remote computing device 104) to generate a schedule for delivering the programming in certain formats that are identified by the programming logic 144a to the participant device 102.

It should be understood that while the components in FIG. 8 are illustrated as residing within the remote computing device 104, this is merely an example. In some embodiments, one or more of the components may reside external to the remote computing device 104 or within other devices, such as the participant device 102 and/or the program administrator device 106 depicted in FIG. 1. It should also be understood that, while the remote computing device 104 is illustrated as a single device, this is also merely an example. In some embodiments, the programming logic 144a and the management logic 144b may reside on different computing devices.

As an example, one or more of the functionalities and/or components described herein may be provided by the remote computing device 104 and/or the participant device 102. Depending on the particular embodiment, any of these devices may have similar components as those depicted in FIG. 8. To this end, any of these devices may include logic for performing the functionality described herein.

Additionally, while the remote computing device 104 is illustrated with the programming logic 144a and the management logic 144b as separate logical components, this is also an example. In some embodiments, a single piece of logic may provide the described functionality. It should also be understood that while the programming logic 144a and the management logic 144b are described herein as the logical components, this is also an example. Other components may also be included, depending on the embodiment.

It should be understood that the present disclosure is directed to, in a digital medium environment, a system of program transmission that is implemented using an artificial intelligence neural network trained model. The system includes one or more processors, and a memory component that stores machine readable instructions that, when executed by the one or more processors, causes the system to perform at least the following: receive participant data of a participant, wherein the participant data includes profile data and content interaction data specific to the participant, wherein the content interaction data includes frequency data and completeness data, compare the frequency data and the completeness data with an interaction threshold, determine whether the participant satisfies the interaction threshold with a first programming in a first format, the first format corresponding to a first supervision level, predict a likelihood of the participant satisfying an additional interaction threshold associated with a second programming in a second format, in response to determining that the likelihood of the participant satisfying the additional interaction threshold exceeds a predetermined likelihood threshold, identify the second programming in the second format for transmission to a participant device, the second format corresponding to a second supervision level that is lower than the first supervision level, and transmit the second programming in the second format to the participant device.

It should also be understood that embodiments provided herein solve a problem that could not be solved by a human mind, with or without pen and paper. As an example, the average case load for a program administrator, such as a parole officer, in the United States is 50 participants to 1 probation officer. Each participant typically has 30 events per week for the probation officer to monitor. This equates to an average of 1,500 events to monitor for each probation officer per week. It is estimated that each event averages 15 minutes for the probation officer, which means that each probation officer needs to spend in excess of 375 hours per week to monitor the events of his/her participants. If the probation officer has only 30 participants, the time requirement is 225 hours. It should be noted that a week only has 168 hours. Consequently, it is physically impossible for a probation officer to competently manage current case loads.

Additionally, embodiments described herein add additional functionality that would further increase the time that the probation officer spends with each participant. In addition, location tracking and the correlation of the participant location into the calculation of the risk factor to determine which level of oversight for a participant could not be performed by a human mind because the amount of time for the probation officer to perform such a task would be greater than the time pressure for the information to be relevant.

As also discussed above, the machine learning performed herein records and leverages data from many probation officers and participants, inside and external to any particular jurisdiction. In other words, the resource recommendations provided herein are optimized based on results from hundreds, if not thousands of parole officers and participants across time; not just one parole officer's experience with resources for their participants. As a consequence, a human parole officer simply cannot assimilate all this data and make these predictions in a useful amount of time because it simply does not naturally get the inputs in order to make those resource recommendation conclusions. Other similar time based and data based reasons are also evident herein.

Therefore, at least the following is claimed:

1. In a digital medium environment, a method of program transmission implemented by a computing device, the method comprising:
   receiving, by a computing device, participant data of a participant, wherein the participant data includes profile data and interaction data specific to the participant, and wherein the interaction data includes frequency data associated with how frequently the participant participated with one or more programming, completeness data associated with the one or more programming that the participant completed; completed, and location restriction data associated with the participant staying outside an exclusion zone;
   making a comparison, by the computing device, of the interaction data with an interaction threshold;
   determining, by the computing device, based on the comparison, whether the participant satisfies the interaction threshold with a first programming in a first format, the first format corresponding to a first supervision level;
   determining, by the computing device, the exclusion zone for the participant based on at least one of the profile data or the interaction data;
   tracking, by the computing device, a location of the participant via a positioning application on a participant device of the participant;
   determining, by the computing device, whether the location is within the exclusion zone;
   predicting, by the computing device, based on whether the participant satisfies the interaction threshold and how often the participant enters the exclusion zone, a likelihood of the participant satisfying an additional interaction threshold associated with a second programming in a second format;
   in response to determining that the likelihood of the participant satisfying the additional interaction threshold exceeds a predetermined likelihood threshold, identifying, by the computing device, the second programming in the second format for transmission to the participant device, the second format corresponding to a second supervision level that is lower than the first supervision level; and
   transmitting, by the computing device, data related to the second programming in the second format to the participant device.

2. The method of claim 1, wherein the first programming includes at least one of the following: an online course, an online lesson, online testing, online reporting of test scores, online content, or a mandatory virtual meeting and wherein the programming is recommended to at least one of the following: the participant or a supervisor.

3. The method of claim 1, wherein the first format includes at least one of the following: an interactive virtual tutorial format, a video format, or an audio format.

4. The method of claim 1, further comprising predicting an additional likelihood of the participant satisfying the additional interaction threshold associated with a third programming corresponding to the first supervision level.

5. The method of claim 4, further comprising:
   identifying the third programming for transmission to the participant device; and
   transmitting the third programming to the participant device.

6. The method of claim 1, further comprising:
   generating a warning message responsive to the determining that the location is within the exclusion zone; and
   outputting the warning message for display.

7. The method of claim 6, further comprising transmitting in real time, to the participant device, a mandatory-meeting request between the participant and a supervising official responsive to determining that the location is within the exclusion zone.

8. The method of claim 1, wherein the first supervision level is associated with a supervising official interacting with the first programming in the first format substantially simultaneously with the participant interacting with the first programming and the second supervision level is associated with the participant interacting with the second programming in the second format independent of the supervising official.

9. The method of claim 1, wherein:
   the profile data of the participant includes one or more of employment data and criminal record data.

10. The method of claim 1, wherein:
    the frequency data is based on a number of times the participant interacts with at least one of the following: the first programming or the second programming; and
    the completeness data is based on a completion level of the participant associated with at least one of the following: the first programming or the second programming.

11. A system comprising:
    a processor; and
    a memory component that stores machine readable instructions that, when executed by the processor, causes the system to perform at least the following:
      receive participant data of a participant, wherein the participant data includes profile data and interaction data specific to the participant, and wherein the interaction data includes frequency data, completeness data, and location restriction data associated with the participant staying out of an exclusion zone;
      compare the frequency data and the completeness data with an interaction threshold;
      determine whether the participant satisfies the interaction threshold with a first programming in a first format, the first format corresponding to a first supervision level;
      determine the exclusion zone for the participant based on at least one of the profile data or the interaction data;
      track a location of the participant via a positioning application on a participant device of the participant;
      determine whether the location is within the exclusion zone;
      predict, based on whether the participant satisfies the interaction threshold and how often the participant enters the exclusion zone, a likelihood of the participant satisfying an additional interaction threshold associated with a second programming in a second format;
      in response to determining that the likelihood of the participant satisfying the additional interaction threshold exceeds a predetermined likelihood threshold, identify the second program in the second format for transmission to the participant device, the second format corresponding to a second supervision level that is lower than the first supervision level; and transmit the second programming in the second format to the participant device.

12. The system of claim 11, wherein the first programming includes at least one of the following: of an online course, an online lesson, or a mandatory virtual meeting.

13. The system of claim 11, wherein the first format includes at least one of the following: an interactive virtual tutorial format, a video format, or an audio format.

14. The system of claim 11, wherein the memory component stores machine readable instructions that, when executed by the processor, further causes the system to predict an additional likelihood of the participant satisfying the additional interaction threshold associated with a third programming corresponding to the first supervision level.

15. The system of claim 14, wherein the memory component stores machine readable instructions that, when executed by the processor, further causes the system to perform at least the following:
identify the third programming for transmission to the participant device; and
transmit the third programming to the participant device.

16. The system of claim 14, wherein the memory component stores machine readable instructions that, when executed by the processor, further causes the system to perform at least the following:
generate a warning message responsive to the determining that the location is within the exclusion zone; and
output the warning message for display.

17. The system of claim 16, wherein the memory component stores machine readable instructions that, when executed by the processor, further causes the system to perform at least the following:
transmit to the participant device, a mandatory-meeting request between the participant and a supervising official responsive to determining that the location is within the exclusion zone.

18. In a digital medium environment, a system of program transmission implemented using an artificial intelligence neural network trained model, the system comprising:

a processor; and a memory component that stores machine readable instructions that, when executed by the processor, causes the system to perform at least the following:

receive participant data of a participant, wherein the participant data includes profile data and interaction data specific to the participant, wherein the interaction data includes frequency data, completeness data, and location restriction data associated with the participant staying out of an exclusion zone;

compare the frequency data and the completeness data with an interaction threshold, determine whether the participant satisfies the interaction threshold with a first programming in a first format, the first format corresponding to a first supervision level;

determine the exclusion zone for the participant based on at least one of the profile data or the interaction data;

track a location of the participant via a positioning application on a participant device of the participant;

determine whether the location is within the exclusion zone;

predict, based on whether the participant satisfies the interaction threshold and how often the participant enters the exclusion zone, a likelihood of the participant satisfying an additional interaction threshold associated with a second programming in a second format;

in response to determining that the likelihood of the participant satisfying the additional interaction threshold exceeds a predetermined likelihood threshold, identify the second programming in the second format for transmission to the participant device, the second format corresponding to a second supervision level that is lower than the first supervision level; and transmit the second programming in the second format to the participant device.

\* \* \* \* \*